United States Patent
Hinton

[15] 3,669,912
[45] June 13, 1972

[54] METHOD OF MAKING DEEP OCEAN BUOYANT MATERIAL

[72] Inventor: Ray F. Hinton, Davidsonville, Md.
[73] Assignee: The United States of America as represented by the Secretary of the Navy
[22] Filed: May 24, 1968
[21] Appl. No.: 747,052

Related U.S. Application Data

[63] Continuation-in-part of Ser. No. 409,032, Dec. 4, 1964, abandoned.

[52] U.S. Cl. .................. 260/2.5 B, 260/2.5 EP, 260/37 EP, 264/117
[51] Int. Cl. ........................................ C08j 1/14, B01j 13/02
[58] Field of Search ...................... 260/2.5 B; 264/117

[56] References Cited

UNITED STATES PATENTS

| | | |
|---|---|---|
| 2,978,340 | 4/1961 | Veatch et al. ..................... 260/2.5 B |
| 2,806,509 | 9/1957 | Bozzacco et al. ................. 260/2.5 B |
| 3,124,626 | 3/1964 | Graham et al. ................... 260/2.5 B |
| 3,084,104 | 4/1963 | Tuerck et al. ........................ 264/117 |
| 3,139,465 | 6/1964 | Klopf ..................................... 264/117 |
| 3,265,679 | 8/1966 | Black et al. ........................... 264/117 |

Primary Examiner—Samuel H. Blech
Assistant Examiner—Morton Foelak
Attorney—George J. Rubens and Roy Miller

[57] ABSTRACT

A buoyant, nonabsorbent, high-strength, low-density, bulk filler material which can be readily mixed and cast for use in the displacement of sea water at great ocean depths. The material of varying pellet-size is formed by dropping epoxy resin into a bed of microspheres under ambient conditions. The droplets absorb the microspheres thereby forming uncured pellets, the size of which is controlled by the size of the droplet. They are then cured for several hours at an elevated temperature.

3 Claims, 6 Drawing Figures

PATENTED JUN 13 1972                                3,669,912

*INVENTOR.*
RAY F. HINTON
BY
*P.H. Firsht*
ATTORNEY.

METHOD OF MAKING DEEP OCEAN BUOYANT MATERIAL

REFERENCE TO RELATED APPLICATION

This invention is a continuation-in-part of patent application Ser. No. 409,032, filed in the U. S. Patent Office on 4 Nov. 1964, now abandoned.

BACKGROUND OF THE INVENTION

The present invention relates generally to improved buoyant materials, and more particularly to a buoyant high-strength, low-density, bulk filler material that may be utilized to displace liquids under great pressures, such as, for example, sea water at great deep-ocean depths, and to a method for forming such material.

Increased activity in deep-ocean exploration has led to an increased activity in the development of low-density displacement materials capable of withstanding those pressures encountered at greater ocean depths, for example, those pressures existing at and below 10,000 feet. Conventional buoyant materials, when subjected to such pressures, tend to absorb water and to compress and/or breakup. Consequently, such displacement materials may become worthless at deep-ocean depths and their use may ultimately lead to the total destruction of deep-living vehicles or instrument packages. Certain materials, such as the syntactic foam disclosed in applicant's copending application Ser. No. 300,395, filed 6 Aug. 1963, have been utilized quite satisfactorily. However, the syntactic foam material disclosed in the aforementioned copending application does not readily lend itself to use where relatively large castings are required, due to the undesired exothermic effects which tend to weaken the casting. Furthermore, it is contemplated that future advances in deep-diving vehicles will require filler materials having even greater strength and buoyance characteristics than the material disclosed by the aforementioned copending application. Therefore, it is the purpose of the present invention to provide nonabsorbent, low-density, high-strength deep-ocean buoyant material, which may be readily cast into large castings for use at great ocean depths in a sea water environment.

SUMMARY OF THE DISCLOSURE

A deep ocean buoyant material formed by injecting droplets of liquid epoxy into a powdery bed of hollow glass spheres known also as microspheres or micro-balloons and cured to form high-strength, low-density pellets. These pellets may be of various sizes, density, and shapes, as dictated by the size of the droplets and the curing process employed. The glass microspheres used were carefully selected for strength from several types of commercially available hollow glass beads. In order to provide a buoyant structural member or packing of homogenous material, the pellets are mixed with an epoxy to provide an extrudable or castable mass, which when formed and cured, provides an extremely hard, high-strength member having low-absorbency and high-buoyancy characteristics. Laminates using hollow beads are known to art such as the material disclosed in U. S. Pat. No. 2,806,509 which issued to Bozzacco et al. on 17 Sept. 1957. The high-strength, low-density, castable buoyant pellets and material prepared by this invention is capable of withstanding pressures encountered at great ocean depths and is an improvement over other known buoyant materials.

It is an object of the instant invention to provide a method of forming a novel high-strength, low-density buoyant material capable of withstanding pressures encountered at great ocean depths. A further object is to provide a castable, low-density, high-strength material which may be used to form large syntactic foam castings. Still a further object is to provide a method of forming a novel low-density, bulk filler material which may be used as buoyant material for deep-diving vehicles. Still another object is to provide high-strength, low-density pellets which may be utilized as a buoyant material.

DESCRIPTION OF THE INVENTION

Figure 1A:
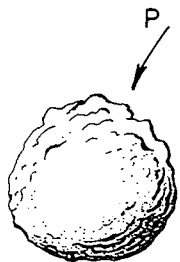
FIGS. 1A, 1B and 1C comprise views of modified formations of the EM pellets of the instant invention.
Figure 1B:
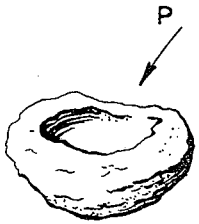
Figure 1C:
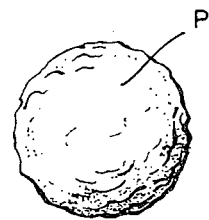

Referring now to the drawings, wherein like reference characters designate like or corresponding parts throughout the several views, there is shown in FIGS. 1A, 1B and 1C alternate modifications of the EM pellets P of the instant invention.

Figure 2:
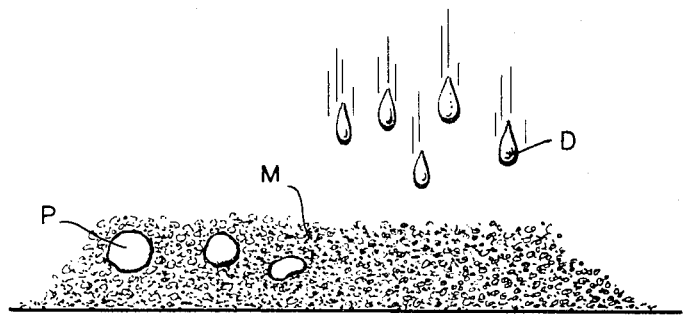
FIG. 2 is a diagrammatic view illustrating a pellet formation step as employed in forming the pellets of FIGS. 1A and 1B.
Figure 3:
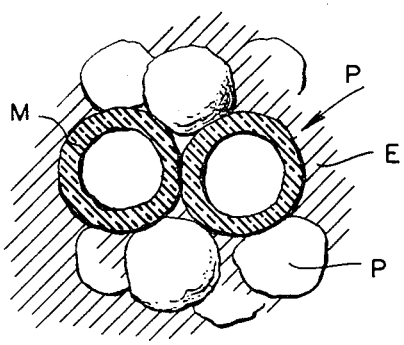
FIG. 3 is a fragmentary cross sectional view, on an enlarged scale, of one of the pellets of FIGS. 1A, 1B and 1C.

Referring now to FIG. 2 pellets P are formed by moving while agitating a tray having a thick bed (one inch or more) of microspheres M of a dry powder consistency beneath a bank of epoxy drop dispensers (not shown) whereby droplets designated D consisting of epoxy are allowed to free-fall into said bed of microspheres M. As a given droplet D passes through the bed of microspheres M, droplets D decelerate and are trapped within the bed of powder-like microspheres M. The epoxy droplet D absorbs microspheres M thereby forming an uncured pellet P. This step takes place at room temperature. The pellets are next cured either in the bed or screened off into separate trays. Curing time depends on the resin used, but generally took about 10 hours at 200° F. to form extremely hard, homogeneous, buoyant pellets.

The microspheres used herein are composed of silicon dioxide microspheres sold under the tradename "Eccosphere SI Microspheres." The following is a list of the physical properties

| | |
|---|---|
| Physical Form | Free flowing powder |
| Particle Size | 30 to 125 microns |
| Wall Thickness | About 2 microns |
| Chemical Composition | Over 95% $SiO_2$ |
| Bulk Density | 11 lbs/cu ft (0.18 g/cc) |
| True Particle Density | About 16.2 lbs/cu ft (0.28 g/cc) |
| Temperature Capability | 2500° F. (1400° C.) |
| Permeability of Particle Wall | Impermeable to water and other liquids |
| Thermal Conductivity of Loosely Packed Material | 0.03 Btu/hr/ft$^2$/°F./ft at 0° F. |
| | 0.04 Btu/hr/ft$^2$/°F./ft at 300°F. |
| Compressive Strength under Hydrostatic Loading; | At least 1000 psi |
| Dielectric Constant (dry), 1 mc to 8600 mc | Approximately 1.16 |
| Dissipation Factor (dry), 1 mc to 8600 mc | Approximately 0.0005 |

The microspheres were bonded together in the shape and size of droplets of an epoxy resin known by the tradename "Epoxy 815" which consists of the reaction product of Bisphenol A, epichlorohydrin and butyl glycidyl ether. It was the preferred resin because its viscosity is only 5 – 9 poises and yet it has a compressive strength comparable to other epoxy resins (18,000 psi) and its liquid absorption is negligible. It is sold with the curing agent or hardener generally known under the tradename "DEAPA," diethylamino propylamine, which has the principal advantages of a long pot life and low exotherm permitting large batches to be mixed and cast.

The saturated droplets of epoxy E, or uncured pellets P, may be cured at elevated temperatures, which causes the epoxy to dry and harden in an expanded state to provide EM pellets of a solid near-spherical configuration, FIG. 1A. This type of pellet normally will not possess the strength of hemispheric pellets, which result from curing the pellets at room temperature, but will possess greater displacement characteristics, since the elevated temperatures cause the microspheres to be dispersed through a greater volume, even though deposited in a like quantity of epoxy. If the uncured pellets P are cured, or dried, at room temperature, viz., allowed to harden, the resulting EM pellets P will, as before-mentioned, be of a generally hemispheric configuration, FIG. 1B. Hence, it is to be understood that the ultimate pellet size may be varied by varying the curing temperature and/or the size of the droplets D, from a mist to very large droplets, and pellet configuration and strength may be varied by varying the temperature at which the pellets P are cured. Furthermore, substantially spherical pellets, such as those shown in FIG. 1C, may be formed by "tumbling" the pellets P during the pellets' early curing stages. The spherical configuration results from the fact that the droplets D of epoxy E, FIG. 2, tend to sag under the effects of gravity as they absorb the surrounding microspheres M to form the uncured pellets P. While the uncured pellets P are in a "soft" or malleable form, they may be inverted and caused to undergo sagging in a reverse direction. Consequently, if the uncured pellets P are continuously rotated, or tumbled, as they are cured or hardened, a substantially spherical pellet P will be produced. This permits a large range of solid pellets to be provided. For example, pellet size may be varied between 1/32 inch to 2 inches, and the configuration may range between a hemisphere and a sphere. The particle density range of the pellets P is approximately 26 – 37 pounds per cubic foot, while the bulk density may be varied according to particle size and shape. The weight ratio of microspheres to resin can range from 20:80 to 50:50.

The basic physical properties of the EM pellets, formed in the aforedescribed manner, are as follows:

a. Percent buoyant force loss due to isostatic compression at 1,500 psi for 24 hours - - - 1.0% maximum b. Percent buoyant force loss after 100 cycles from 0 to 1,500 psi, plus 6 hours hold time - - - 1.0% maximum c. Percent liquid absorption under conditions of (a) and (b) - - - 0.1% by weight maximum.

The EM pellets may be utilized in free-flowing bulk form to provide a buoyant bulk material. However, these pellets are particularly useful in forming large syntactic castings, heretofore extremely difficult to obtain due to the weakening exothermic effects which occur as the casting is curing.

In order to provide a castable material, the pellets P are mixed with a liquid epoxy, including a hardener, (consisting of about 95% Epon 815 and 5% DEAPA) cast, and allowed to cure to form a hardened, buoyant casting. Since the pellets P are in a cured state and comprise a large portion, by volume, of the castable material, the effect of exotherm is negligible for practical purposes. Consequently, larger castings are now possible when using the pellets of the instant invention.

Figure 4:
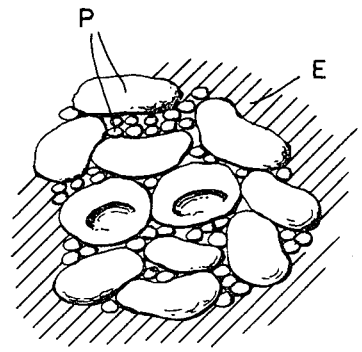
FIG. 4 is a fragmentary cross sectional view of a casting formed of pellets similar to those of FIGS. 1A, 1B and 1C.

Since the pellets P have a lesser density value than the epoxy E, the greater the concentration of pellets the greater will be the displacement characteristics of the castable material. Hence, as a practical matter, it may be found desirable to utilize smaller pellets alone, or in combination with larger pellets, FIG. 4, to achieve maximum buoyancy or displacement capabilities. Further, the greater the ratio of pellets to epoxy, the smaller will be the quantity of total liquid required for a casting. Therefore, through using a mixture of pellets and epoxy or slightly filled epoxy, i.e., epoxy containing approximately 10% microspheres, as contrasted to epoxy and microspheres alone, to form a castable material, improved physical characteristics of the resulting casting is achieved. This saving is of importance in many areas including the required curing time for a given casting, material storage and transport, and in providing molds of sufficient strength to accommodate certain casting operation.

In view of the foregoing, it is to be understood that the present invention provides a novel method of forming a novel strong, hard, water resistant buoyant material, which may be utilized for displacing a liquid under great pressures. The material may be utilized in a free-flowing bulk form or it may be utilized as a castable buoyant material for large syntactic castings. Further, the specific microspheres, epoxies, hardness, and curing temperatures may be varied to obtain buoyant materials having desired physical characteristics.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. The process of preparing buoyant, nonabsorbent, low-density pellets which consists of moving a layer at least one-inch thick of hollow glass microspheres beneath an array of drop dispensers containing epoxy resin consisting essentially of the reaction product of Bisphenol A, epichlorohydrin and butyl glycidyl ether;

dispensing at room temperature free-falling droplets of said resin into said layer of microspheres whereby said droplets absorb a plurality of said microspheres to form pellets in a weight ratio of microspheres to resin ranging from 20:80 to 50:50 based on the weight of the resin; and curing said pellets until rigid.

2. The process of claim 1 wherein said microspheres consist essentially of over 95% silicon dioxide ranging in size from 30 to 125 microns having a wall thickness of about 2 microns, a density of 28 g/cc, a temperature capability of 1,400° C., and a compressive strength under hydrostatic loading of at least 1,000 psi.

3. The method in accordance with claim 1 characterized by the additional step of tumbling said pellets as they cure thereby forming pellets having a substantially spherical configuration.

* * * * *